United States Patent [19]
Iseki

[11] Patent Number: 6,138,328
[45] Date of Patent: Oct. 31, 2000

[54] WEBBING INSERTION MEMBER

[75] Inventor: Hideo Iseki, Shiga, Japan

[73] Assignee: Takata Corporation, Tokyo, Japan

[21] Appl. No.: 09/375,800

[22] Filed: Aug. 17, 1999

[30] Foreign Application Priority Data

Aug. 27, 1998 [JP] Japan .................................. 10-241880

[51] Int. Cl.$^7$ ...................................................... A44B 11/00
[52] U.S. Cl. ........................ 24/197; 280/808; 24/265 BC
[58] Field of Search .............................. 24/171, 191, 190, 24/197, 265 BC, 265 AL, 194; 280/808, 801.1, 806; 297/483

[56] References Cited

U.S. PATENT DOCUMENTS

| | | | |
|---|---|---|---|
| 4,211,432 | 7/1980 | Furukawa et al. ...................... | 280/808 |
| 4,527,313 | 7/1985 | Sylven et al. ................... | 24/265 BC X |
| 4,582,340 | 4/1986 | Föhl ......................................... | 280/808 |
| 5,513,880 | 5/1996 | Ohira et al. .............................. | 280/808 |
| 5,601,311 | 2/1997 | Pfeiffer et al. ........................ | 280/801.1 |
| 5,609,367 | 3/1997 | Eusebi et al. ............................ | 280/808 |

*Primary Examiner*—Anthony Knight
*Assistant Examiner*—Robert J. Sandy
*Attorney, Agent, or Firm*—Kanesaka & Takeuchi

[57] ABSTRACT

A webbing insertion member for a seat belt is formed of a body having a through opening for allowing a webbing to pass therethrough, a slide portion formed on at least one side of the through opening to substantially contact the webbing, and a friction reducing material formed on the slide portion of the through opening for allowing the webbing to slide easily. Thus, efficiency of sliding of the webbing is improved significantly, to thereby reduce the failure of winding of the webbing into a retractor and facilitate withdrawal and winding of the webbing.

2 Claims, 4 Drawing Sheets

WEBBING INSERTION MEMBER

BACKGROUND OF THE INVENTION AND RELATED ART STATEMENT

The present invention relates to a webbing insertion member used for, such as deflection fitting or shoulder anchor, in a seat belt device.

Seat belt devices are used in high-speed vehicles, such as automobiles and aircraft, for protecting occupants by means of webbings thereof. For example, as for a seat belt device for a front seat of an automobile, the webbing is hooked by a deflection fitting or shoulder anchor disposed on a frame or B pillar of the automobile.

The deflection fitting is normally formed by insert molding so that a metal body as a metal insert is covered with a mold made of synthetic resin (normally, polyamide).

The deflection fitting or shoulder anchor is provided with a webbing through opening. Surfaces on which the webbing slides are made of the aforementioned synthetic resin, so that frictional resistance in sliding the webbing is large.

It is an object of the present invention to provide a webbing insertion member allowing smooth sliding of the webbing.

Another object of the invention is to provide a webbing insertion member as stated above, wherein the webbing can be easily handled by a user.

Further objects and advantages of the invention will be apparent from the following description of the invention.

SUMMARY OF THE INVENTION

A webbing insertion member of the present invention has a through opening for a webbing, and a low friction material, i.e. friction reducing material, is disposed on a slide portion around the through opening on which the webbing slides.

In the webbing insertion member, the frictional resistance to sliding of the webbing is made quite small because of the low friction material.

According to the present invention, a metal piece is disposed on the slide portion around the through opening, and the low friction material is disposed on the surface of the metal piece.

It is preferable that the low frictional material is a coating of solid lubricant and/or metal plating.

DETAILED DESCRIPTION OF PREFERRED EMBODIMENTS

Figure 1:
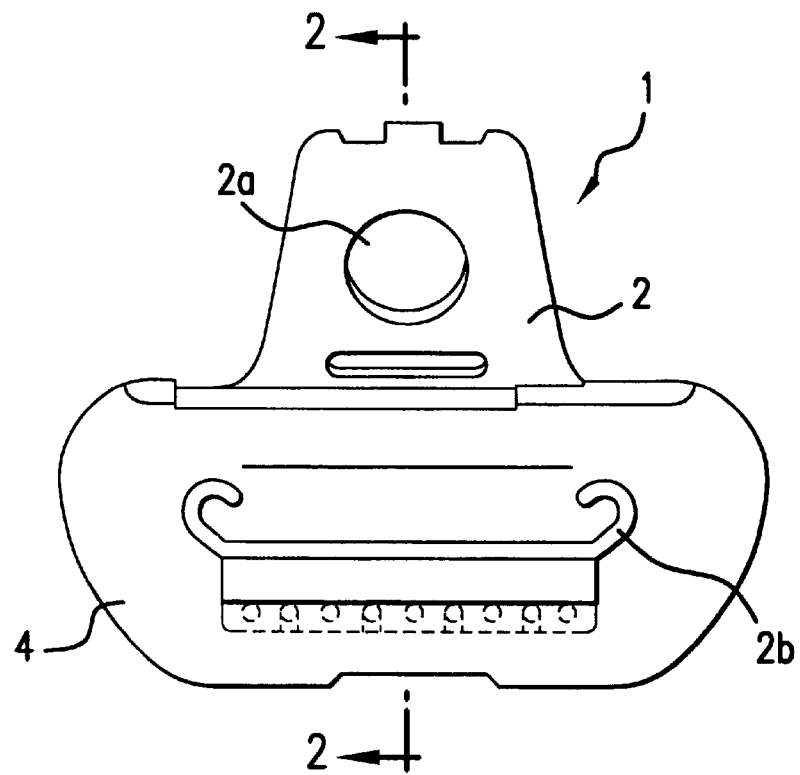
FIG. 1 is a front view of a deflection fitting or shoulder anchor as a webbing insertion member according to an embodiment of the invention.
Figure 2:
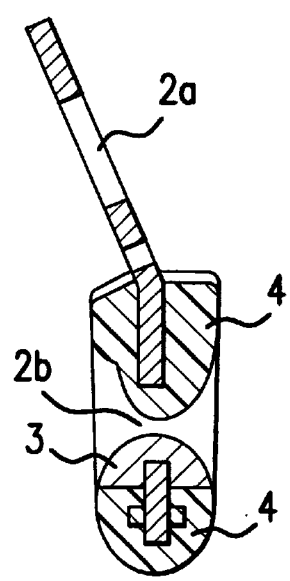
FIG. 2 is a sectional view taken along line 2—2 in FIG. 1.
Figure 3:
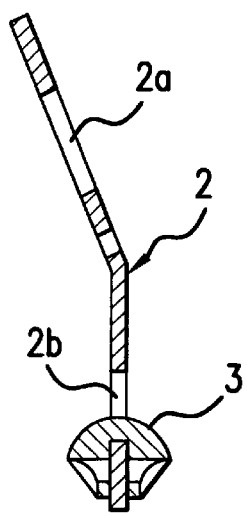
FIG. 3 is a sectional view illustrating the engagement between a slip piece and a body of the deflection fitting.
Figure 4:
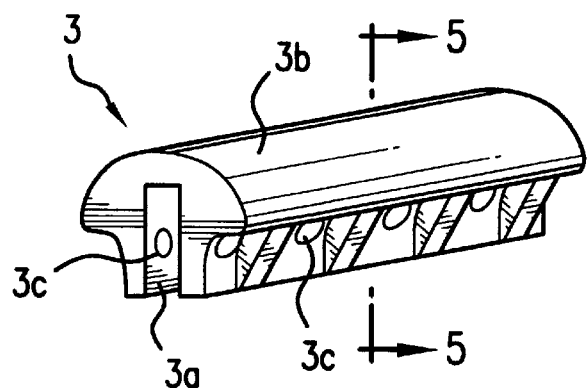
FIG. 4 is a perspective view of the slip piece.
Figure 5:
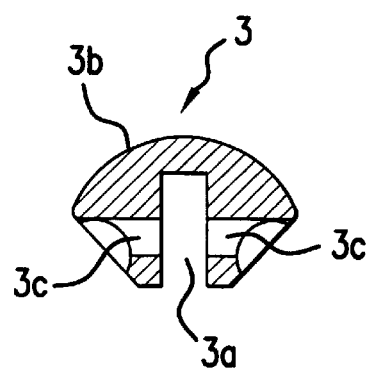
FIG. 5 is a sectional view taken along line 5—5 in FIG. 4

FIG. 1 is a front view of a deflection fitting or shoulder anchor as a webbing insertion member according to an embodiment; FIG. 2 is a sectional view taken along line 2—2 in FIG. 1; FIG. 3 is a sectional view illustrating an engagement between a slip piece and a body; FIG. 4 is a perspective view of a slip piece; and FIG. 5 is a sectional view taken along line 5—5 in FIG. 4.

A deflection fitting or shoulder anchor 1 comprises a plate-like body 2 made of metal, a slip piece 3 engaging the body 2, and a synthetic resin mold 4.

Formed in an upper portion of the body 2 is a bolt through hole 2a for fixing the deflection fitting 1 to a frame or B pillar. Formed in a lower portion of the body 2 is a webbing through opening 2b.

The slip piece 3 has a groove 3a into which an edge of the through opening 2b is fitted, and a guide surface 3b which is curved for guiding the webbing. In addition, the slip piece 3 has through holes 3c for connecting the groove 3a and sides of the slip piece 3. The synthetic resin mold 4 enters into the through holes 3c to improve the integrity between the synthetic resin mold 4 and the slip piece 3.

Formed on the surface of the curved portion 3b of the slip piece 3 is a layer of a low friction material, i.e. friction reducing material. Examples of the layer of the low friction material include fluororesin, e.g. tetrafluoroethylene, coating, nickel plating, chrome plating, boron plating, and besides the above, ceramic coatings, such as molybden disulfide coating, tungsten disulfide coating, boron nitride coating, and fluoride graphite coating. Forming such a coating or plating having excellent solid lubricity provides quite smooth sliding of the webbing. It should be noted that the curved portion 3b may have a plurality of layers of plating, or may have one or more layers of coatings on the layer of plating.

Such a layer of excellent solid lubricity may be formed on the surface of the synthetic resin mold 4.

After the groove 3a of the slip piece 3 is engaged with the webbing through opening 2b of the body 2, the insert molding is conducted to form the synthetic resin mold 4, thereby making the deflection fitting. The synthetic resin may be polyamide, such as nylon.

Figure 6:
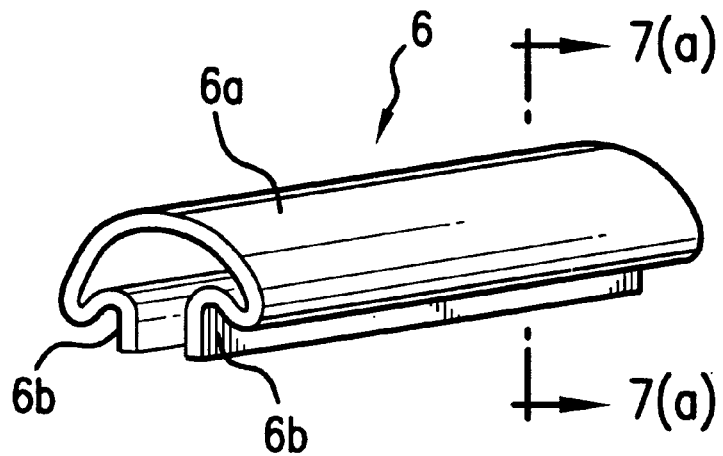
FIG. 6 is a perspective view of a slip piece used in a deflection fitting according to another embodiment.
Figure 7A:
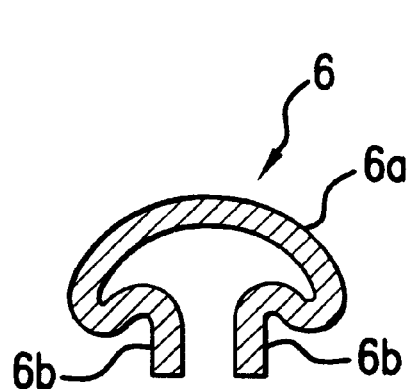
FIG. 7(a) is a sectional view taken along line 7(a)—7(a) in FIG. 6.
Figure 7B:
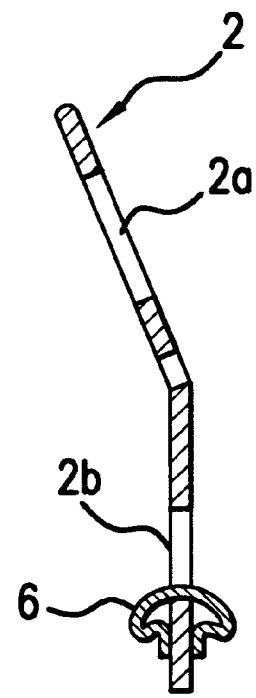
FIG. 7(b) is a sectional view illustrating the engagement between the slip piece and the body of the deflection fitting.

FIG. 6 is a slip piece used in a deflection fitting according to another embodiment; FIG. 7(a) is a sectional view taken along line 7(a)—7(a) in FIG. 6; and FIG. 7(b) is a sectional view illustrating the engagement between the slip piece and the body.

The slip piece 6 is made of a metal plate by press working so as to have a curved portion 6a and a pair of parallel legs 6b. The edge of the webbing through opening 2b of the body 2 is clamped between the parallel legs 6b, as shown in FIG. 7(b). The aforementioned plating or coating layer having excellent solid lubricity is formed on the surface of the curved portion 6a. The insert molding is conducted to make the deflection fitting as shown in FIG. 1, by using the subassembly composed of the body 2 and the slip piece 6 as shown in FIG. 7(b) as a metal insert.

Figure 8:
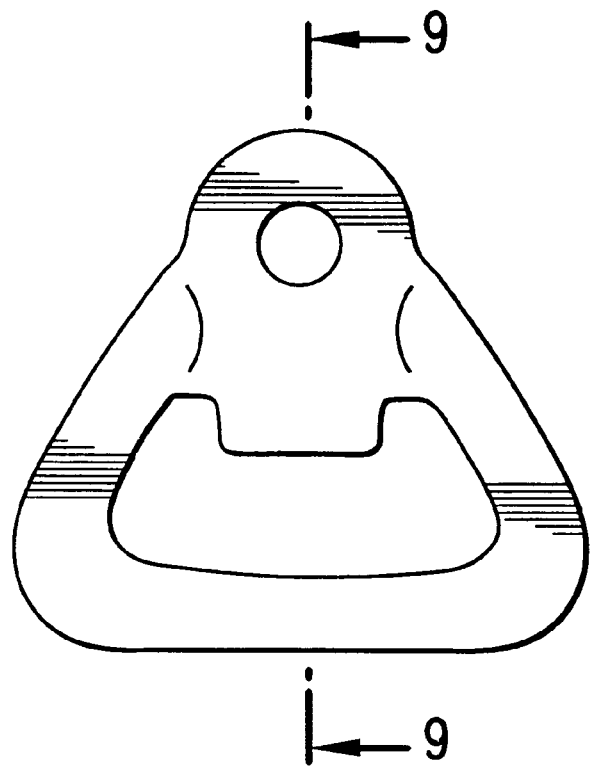
FIG. 8 is a front view of a webbing insertion member according to a different embodiment of the invention.
Figure 9:
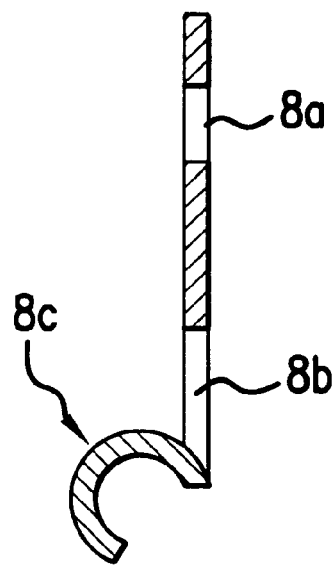
FIG. 9 is a sectional view taken along line 9—9 in FIG. 8.

FIG. 8 is a front view of a webbing insertion member 8 according to a different embodiment, and FIG. 9 is a sectional view taken along line 9—9 in FIG. 8.

The webbing insertion member 8 is generally made of a metal plate, and has a bolt through hole 8a and a webbing through opening 8b. The portion under the webbing through opening 8b is curved by press working to have a curved portion 8c having a C-like section. Formed on the surface of the curved portion 8c is a plating or coating layer having excellent solid lubricity.

Though the aforementioned embodiments relate to the deflection fitting or shoulder anchor, the present invention may be applied to a tongue of a seat belt device.

As described above, according to the webbing insertion member of the present invention, the efficiency of sliding of the webbing is improved significantly, thereby reducing the failure of winding of the webbing into a retractor and providing good withdrawing and winding of the webbing for the retractor.

While the invention has been explained with reference to the specific embodiments of the invention, the explanation is illustrative and the invention is limited only by the appended claims.

What is claimed is:

1. A webbing insertion member comprising:

a body having a through opening for allowing a webbing to pass therethrough, a slip piece formed separately from the body and attached to the body at one side of the through opening to substantially contact the webbing, said slip piece having a surface facing the through opening, a base at a side away from the surface, a groove formed in the base in which a part of the body is situated and holes formed in the base to extend into the groove, a friction reducing material disposed on the surface of the slip piece for allowing the webbing to slide easily, and a resin for covering the body and disposed in the holes to hold the slip piece on the body.

2. A webbing insertion member according to claim 1, wherein said friction reducing material is at least one member selected from a group consisting of a coating of solid lubricant and metal plating.

* * * * *